United States Patent
Uka et al.

(10) Patent No.: US 10,600,579 B2
(45) Date of Patent: Mar. 24, 2020

(54) ELECTROLYTIC CAPACITOR INCLUDING HYDROXY COMPOUND AND MANUFACTURING METHOD THEREFOR

(71) Applicant: Panasonic Intellectual Property Management Co., Ltd., Osaka (JP)

(72) Inventors: Youichirou Uka, Hyogo (JP); Katsuya Miyahara, Osaka (JP); Hiroshi Kojima, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 42 days.

(21) Appl. No.: 15/701,557

(22) Filed: Sep. 12, 2017

(65) Prior Publication Data

US 2018/0005759 A1 Jan. 4, 2018

Related U.S. Application Data

(63) Continuation of application No. PCT/JP2016/001427, filed on Mar. 14, 2016.

(30) Foreign Application Priority Data

Mar. 31, 2015 (JP) .................................. 2015-070975

(51) Int. Cl.
*H01G 9/028* (2006.01)
*H01G 9/025* (2006.01)
(Continued)

(52) U.S. Cl.
CPC .............. *H01G 9/028* (2013.01); *C25B 1/04* (2013.01); *H01G 9/0036* (2013.01);
(Continued)

(58) Field of Classification Search
CPC .......... H01G 9/028; H01G 9/15; H01G 9/025; H01G 9/0036
See application file for complete search history.

(56) References Cited

U.S. PATENT DOCUMENTS 6,430,033 B1 * 8/2002 Mitsui .................. H01G 9/0036
    252/62.2
7,842,196 B2 * 11/2010 Yoshida .................. C08L 65/00
    252/500

(Continued)

FOREIGN PATENT DOCUMENTS

JP  2007184318 A  *  7/2007
JP  2008-109069        5/2008

(Continued)

OTHER PUBLICATIONS https://www.worldofchemicals.com/chemicals/chemical-properties/xylitol.html, printed 2019.*

(Continued)

*Primary Examiner* — David M Sinclair
(74) *Attorney, Agent, or Firm* — McDermott Will & Emery LLP

(57) ABSTRACT

An electrolytic capacitor includes an anode body, a first conductive polymer layer, and a second conductive polymer layer. The anode body includes a dielectric layer. The first conductive polymer layer covers at least a part of the dielectric layer. The second conductive polymer layer covers at least a part of the first conductive polymer layer. The first conductive polymer layer includes a first conductive polymer. The second conductive polymer layer includes a second conductive polymer. At least one of the first conductive polymer layer and the second conductive polymer layer further includes a hydroxy compound. The hydroxy compound has two or more alcoholic hydroxy groups or two or more phenolic hydroxy groups, and has a melting point ranging from 40° C. to 150° C., inclusive.

6 Claims, 1 Drawing Sheet

(51) Int. Cl.
*H01G 9/00* (2006.01)
*H01G 9/15* (2006.01)
*C25B 1/04* (2006.01)

(52) U.S. Cl.
CPC .............. *H01G 9/025* (2013.01); *H01G 9/15* (2013.01); *H01M 2300/0002* (2013.01); *Y02E 60/366* (2013.01)

(56) References Cited

U.S. PATENT DOCUMENTS

| | | | |
|---|---|---|---|
| 2009/0021894 A1* | 1/2009 | Ning | C09D 5/24 361/527 |
| 2009/0128997 A1* | 5/2009 | Kikuchi | C23C 28/00 361/524 |
| 2010/0165546 A1 | 7/2010 | Yoshida et al. | |
| 2011/0019340 A1* | 1/2011 | Nobuta | C08K 5/053 361/525 |
| 2012/0206860 A1* | 8/2012 | Chen | H01G 9/0036 361/532 |
| 2013/0070393 A1* | 3/2013 | Kamiyama | H01G 9/0036 361/528 |
| 2013/0236636 A1* | 9/2013 | Nobuta | H01G 9/0036 427/80 |
| 2014/0185192 A1 | 7/2014 | Sugawara et al. | |
| 2015/0225589 A1* | 8/2015 | Ohori | C09D 11/52 252/500 |

FOREIGN PATENT DOCUMENTS

| | | |
|---|---|---|
| JP | 2011-151205 | 8/2011 |
| JP | 2014-127682 | 7/2014 |

OTHER PUBLICATIONS https://www.worldofchemicals.com/chemicals/chemical-properties/sorbitol.html, printed 2019.*
https://webbook.nist.gov/cgi/cbook.cgi?ID=C120809&Mask=80, printed 2019.*
International Search Report of PCT application No. PCT/JP2016/001427 dated May 24, 2016.

* cited by examiner

ELECTROLYTIC CAPACITOR INCLUDING HYDROXY COMPOUND AND MANUFACTURING METHOD THEREFOR

RELATED APPLICATIONS

This application is a continuation of the PCT International Application No. PCT/JP2016/001427 filed on Mar. 14, 2016, which claims the benefit of foreign priority of Japanese patent application No. 2015-070975 filed on Mar. 31, 2015, the contents all of which are incorporated herein by reference.

BACKGROUND

1. Technical Field

The present disclosure relates to an electrolytic capacitor including a conductive polymer layer as a solid electrolyte layer, and a method for manufacturing the electrolytic capacitor.

2. Description of the Related Art

In recent years, a small-sized and large-capacitance capacitor for high frequency applications has been desired along with downsizing and lightening of electronic devices. As such a capacitor, an electrolytic capacitor having small equivalent series resistance (ESR) and excellent frequency characteristics has been developed. The electrolytic capacitor includes an anode body including a valve metal such as tantalum, niobium, titanium, and aluminum, a dielectric layer formed on the anode body, and a cathode body. Particularly, an electrolytic capacitor including, as a cathode member, a solid electrolyte layer that is formed on the dielectric layer and includes a conductive polymer is referred to a solid electrolytic capacitor.

The solid electrolyte layer including a conductive polymer sometimes includes, as an additive, a component other than the conductive polymer. For example, Unexamined Japanese Patent Publication No. 2008-109069 proposes adding, for example, a wide variety of water-soluble compounds and alkaline compounds to the solid electrolyte layer.

SUMMARY

An electrolytic capacitor according to a first aspect of the present disclosure includes an anode body and a solid electrolyte layer. The anode body includes a dielectric layer. The solid electrolyte layer covers at least a part of the dielectric layer and includes a hydroxy compound. The solid electrolyte layer includes a first conductive polymer layer and a second conductive polymer layer. The first conductive polymer layer includes a first conductive polymer and covers at least a part of the dielectric layer. The second conductive polymer layer includes a second conductive polymer and covers at least a part of the first conductive polymer layer. The second conductive polymer layer includes a polymer dopant and a hydroxy compound. The hydroxy compound has two or more alcoholic hydroxy groups or two or more phenolic hydroxy groups. And the hydroxy compound has a melting point ranging from 40° C. to 150° C., inclusive.

An electrolytic capacitor according to a second aspect of the present disclosure includes an anode body and a solid electrolyte layer. The anode body includes a dielectric layer. The solid electrolyte layer covers at least a part of the dielectric layer and includes a conductive polymer, a polymer dopant, and a hydroxy compound. The hydroxy compound has two or more alcoholic hydroxy groups or two or more phenolic hydroxy groups. And the hydroxy compound has a melting point ranging from 40° C. to 150° C., inclusive.

A method for manufacturing an electrolytic capacitor according to a third aspect of the present disclosure includes following steps. First step: preparing an anode body including a dielectric layer. Second step: forming a solid electrolyte layer covering at least a part of the dielectric layer and including a hydroxy compound. The second step includes following steps. Step A: forming, with use of a first treatment solution, a first conductive polymer layer covering at least a part of the dielectric layer and including a first conductive polymer. Step B: forming, with use of a second treatment solution, a second conductive polymer layer covering at least a part of the first conductive polymer layer and including a second conductive polymer. The second treatment solution contains a polymer dopant and the hydroxy compound. The hydroxy compound has two or more alcoholic hydroxy groups or two or more phenolic hydroxy groups. And the hydroxy compound has a melting point ranging from 40° C. to 150° C., inclusive.

At least one selected from the group consisting of hexanediol, neopentyl glycol, trimethylolpropane, and catechol, for example, can be used as the hydroxy compound.

According to the present disclosure, there can be provided an electrolytic capacitor in which leakage current is suppressed and ESR is reduced.

DETAILED DESCRIPTION OF EMBODIMENT

Figure 1:
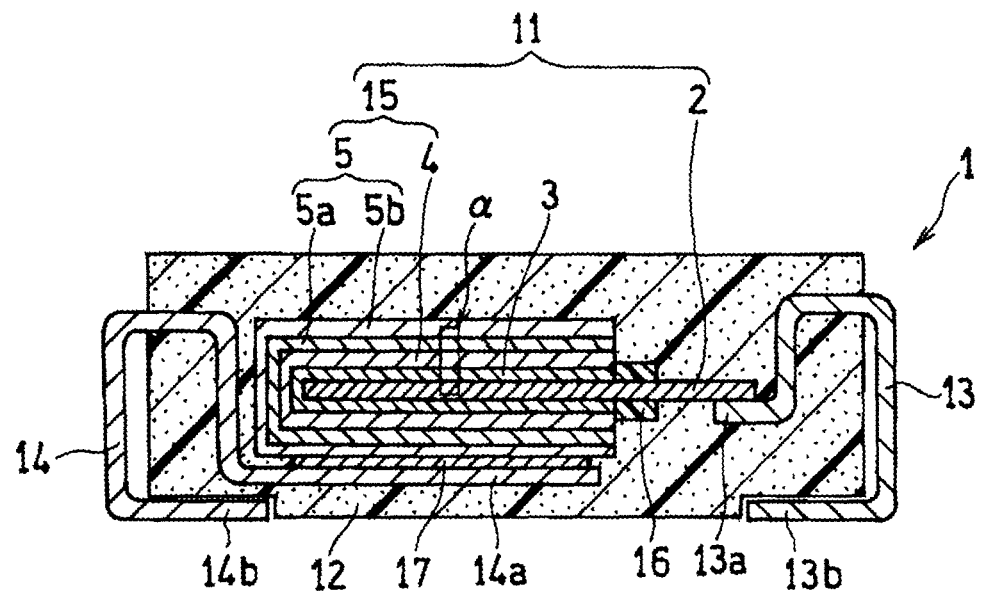
FIG. 1 is a schematic sectional view illustrating an electrolytic capacitor according to one exemplary embodiment of the present disclosure.

Prior to describing exemplary embodiments of the present disclosure, problems in a conventional electrolytic capacitor are described. In designing of an electrolytic capacitor, reduction of ESR is important. As the electrolytic capacitor in JP 2008-109069 A, however, random addition of an additive to a solid electrolyte layer sometimes deteriorates film quality of the solid electrolyte layer. Deterioration in film quality does not allow sufficient reduction of the ESR and sometimes increases leakage current.

The present disclosure provides a technique capable of suppressing the leakage current and reducing the ESR in the electrolytic capacitor including the solid electrolyte layer.

Hereinafter, exemplary embodiments of an electrolytic capacitor and a method for manufacturing the electrolytic capacitor according to the present disclosure are described with reference to the drawings. The present disclosure, however, is not limited to the following exemplary embodiments.

(Electrolytic Capacitor)

An electrolytic capacitor according to one exemplary embodiment of the present disclosure includes an anode body including a dielectric layer, and a solid electrolyte layer covering at least a part of the dielectric layer and including a hydroxy compound. The solid electrolyte layer includes at least one layer including a conductive polymer, a polymer dopant, and the hydroxy compound. The hydroxy compound has two or more alcoholic hydroxy groups or two or more phenolic hydroxy groups. And the hydroxy compound has a melting point ranging from 40° C. to 150° C., inclusive. The solid electrolyte layer is preferred to include a first conductive polymer layer covering at least a part of the dielectric layer and including a first conductive polymer, and a second conductive polymer layer covering at least a part of the first conductive polymer layer and including a second conductive polymer. In this configuration, however, at least the second conductive polymer layer is preferred to include, in addition to the second conductive polymer, a polymer dopant and the hydroxy compound. On the other hand, the first conductive polymer layer does not necessarily include the hydroxy compound. The first conductive polymer layer is a conductive polymer layer most adjacent to the dielectric layer.

When the first conductive polymer layer and the second conductive polymer layer each include a hydroxy compound, a concentration of the hydroxy compound included in the second conductive polymer layer is desired to be higher than a concentration of the hydroxy compound included in the first conductive polymer layer.

The electrolytic capacitor is manufactured by, for example, a manufacturing method that includes a first step of preparing an anode body including a dielectric layer, and a second step of forming a solid electrolyte layer covering at least a part of the dielectric layer and including a hydroxy compound. Here, the second step includes at least a step of forming, with use of a treatment solution containing a conductive polymer, a polymer dopant, and the hydroxy compound, a layer including the conductive polymer, the polymer dopant, and the hydroxy compound. These steps provide an electrolytic capacitor in which the ESR is reduced. Further, such a method can easily be performed to give an advantage of reducing production costs.

The second step preferably includes a step A of forming, with use of a first treatment solution, a first conductive polymer layer covering at least a part of the dielectric layer and including a first conductive polymer, and a step B of forming, with use of a second treatment solution, a second conductive polymer layer covering at least a part of the first conductive polymer layer and including a second conductive polymer. In these steps, at least the second treatment solution is preferred to contain the second conductive polymer, the polymer dopant, and the hydroxy compound. On the other hand, the first treatment solution does not necessarily contain the hydroxy compound.

When the first treatment solution and the second treatment solution each contain the hydroxy compound, a concentration of the hydroxy compound contained in the second treatment solution is preferred to be made higher than a concentration of the hydroxy compound contained in the first treatment solution. This arrangement enables the concentration of the hydroxy compound included in the second conductive polymer layer to be higher than the concentration of the hydroxy compound included in the first conductive polymer layer.

A structure of the solid electrolyte layer is not particularly limited. For example, the solid electrolyte layer may be a single conductive polymer layer. The solid electrolyte layer may include the first conductive polymer layer and the second conductive polymer layer, or further include another one or more conductive polymer layers.

Figure 2:
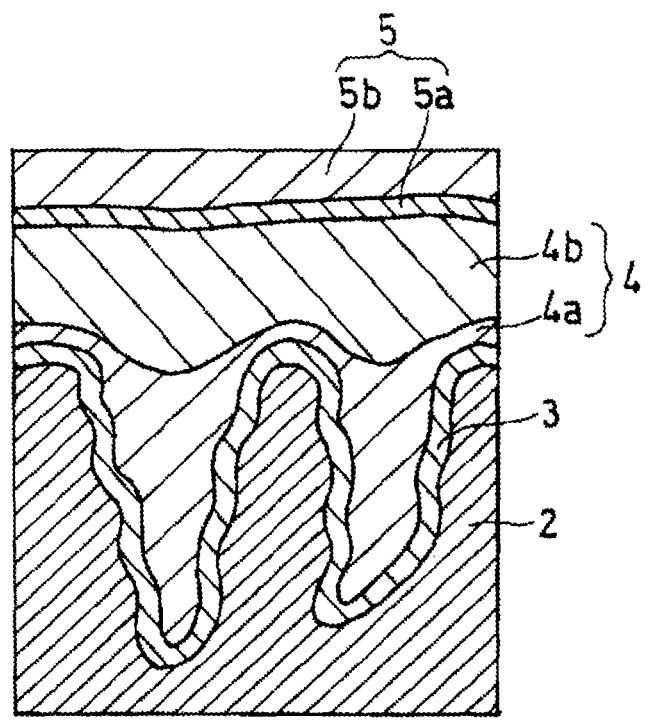
FIG. 2 is an enlarged view illustrating an area surrounded by a solid line a in FIG. 1.

Hereinafter, the solid electrolyte layer including the first conductive polymer layer and the second conductive polymer layer is described in more detail. FIG. 1 is a schematic sectional view illustrating an electrolytic capacitor according to one exemplary embodiment of the present disclosure. FIG. 2 is an enlarged view illustrating an area surrounded by a solid line a in FIG. 1.

Electrolytic capacitor 1 includes capacitor element 11, resin outer packing 12 that encapsulates capacitor element 11, and anode terminal 13 and cathode terminal 14 that are exposed to the outside of resin outer packing 12. Capacitor element 11 includes anode body 2 having, for example a foil or plate shape, dielectric layer 3 covering anode body 2, and cathode portion 15 covering dielectric layer 3. Anode terminal 13 is electrically connected to anode body 2, and cathode terminal 14 is electrically connected to cathode portion 15. Resin outer packing 12 has an almost rectangular parallelepiped outer shape, and therefore electrolytic capacitor 1 also has an almost rectangular parallelepiped outer shape.

Anode body 2 and cathode portion 15 are opposite to each other with dielectric layer 3 interposed between anode body 2 and cathode portion 15. Cathode portion 15 includes solid electrolyte layer 4 covering dielectric layer 3 and cathode layer 5 covering solid electrolyte layer 4. Cathode layer 5 shown in the drawings has a two-layer structure, and includes carbon layer 5a in contact with solid electrolyte layer 4 and silver paste layer 5b covering a surface of carbon layer 5a.

Anode body 2 has an area on which insulating separation part 16 is formed so as to zonally cover a surface of anode body 2, the area being in an end of anode body 2 that protrudes from cathode portion 15 and being adjacent to cathode portion 15. Thus, a contact between cathode portion 15 and anode body 2 is restricted at the area. The end of anode body 2 that protrudes from cathode portion 15 is electrically connected to first end 13a of anode terminal 13 by welding or the like. Meanwhile, cathode layer 5 formed as an outermost layer of cathode portion 15 is electrically connected to first end 14a of cathode terminal 14 via conductive adhesive material 17. Second end 13b of anode terminal 13 and second end 14b of cathode terminal 14 are drawn out from side surfaces of resin outer packing 12 which are different from each other, respectively. And second end 13b of anode terminal 13 and second end 14b of cathode terminal 14 each extend to one main flat surface (lower surface in FIG. 1) in an exposed state. The exposed parts of the terminals (anode terminal 13 and cathode terminal 14) on the flat surface are used for, for example, solder connections to a substrate (not shown in the drawings) on which electrolytic capacitor 1 is to be mounted.

Dielectric layer 3 is formed on a part of a surface of a conductive material constituting anode body 2 that is porous. Specifically, dielectric layer 3 can be formed by anodizing the surface of the conductive material constituting anode body 2. Accordingly, dielectric layer 3 is, as shown in FIG. 2, formed along a surface (including an inner wall surface of pores) of a porous body constituting anode body 2.

Solid electrolyte layer 4, which is formed so as to cover dielectric layer 3, includes first conductive polymer layer 4a covering dielectric layer 3, and second conductive polymer layer 4b covering first conductive polymer layer 4a. First conductive polymer layer 4a does not necessarily cover whole (a whole surface of) dielectric layer 3 and is satisfactory as long as first conductive polymer layer 4a is formed so as to cover at least a part of dielectric layer 3. In a same manner, second conductive polymer layer 4b does not necessarily cover whole (a whole surface of) first conductive polymer layer 4a and is satisfactory as long as second conductive polymer layer 4b is formed so as to cover at least a part of first conductive polymer layer 4a.

(Anode Body)

As the anode body, a porous body having conductivity can be used. As a conductive material forming the porous body, there can be exemplified a valve metal, an alloy including a valve metal, and a compound including a valve metal. These materials can be used alone or in combination of two or more materials. As the valve metal, for example, titanium, tantalum, aluminum and/or niobium is preferred to be used. Oxides of these metals have a high dielectric constant, and therefore these metals are suitable as a constituent material of the anode body.

Examples of the alloy including a valve metal include an alloy including two or more valve metals and an alloy of a valve metal with a typical element (e.g., vanadium, silicon, and boron). The alloy is preferred to include the valve metal as a main component, and a proportion of the valve metal in the alloy is preferred to be 50% by atom or more.

The porous body can be obtained, for example, by roughening a surface of a base material (e.g., a foil- or plate-shaped base material) formed from the conductive material and by forming particles of the conductive material into a predetermined shape and sintering a resultant molded body.

(Dielectric Layer)

The dielectric layer is formed by anodizing, through an anodizing treatment or the like, the conductive material on a surface of the anode body. Accordingly, the dielectric layer includes an oxide of the conductive material (particularly, the valve metal). For example, when tantalum is used as the valve metal, the dielectric layer includes $Ta_2O_5$. When aluminum is used as the valve metal, the dielectric layer includes $Al_2O_3$. The dielectric layer, however, is not limited to these examples.

(Solid Electrolyte Layer)

The solid electrolyte layer includes a first conductive polymer layer covering at least a part of the dielectric layer, and a second conductive polymer layer covering at least a part of the first conductive polymer layer. When the solid electrolyte layer includes the first conductive polymer layer and the second conductive polymer layer, the second conductive polymer layer is satisfactory as long as the second conductive polymer layer is formed so as to cover at least a part of the first conductive polymer layer, and the second conductive polymer layer may be formed so as to cover a whole surface of the first conductive polymer layer. Further, in an area on a surface of the dielectric layer, where the first conductive polymer layer is not formed, the second conductive polymer layer may be in contact with the dielectric layer.

At least the second conductive polymer layer among the first conductive polymer layer and the second conductive polymer layer, which are included in the solid electrolyte layer, is preferred to include a polymer dopant and a hydroxy compound. The first conductive polymer layer does not necessarily include the hydroxy compound. An absolute amount of the second conductive polymer layer is larger than an absolute amount of the first conductive polymer layer that is in contact with the dielectric layer. Therefore, addition of the hydroxy compound at least to the second conductive polymer layer increases an effect of improving conductivity.

(Hydroxy Compound)

The hydroxy compound has two or more alcoholic hydroxy groups or two or more phenolic hydroxy groups, and has a melting point ranging from 40° C. to 150° C., inclusive. Such a hydroxy compound has an effect of increasing crystallinity of the conductive polymer, improving the conductivity, and reducing the ESR. Although a reason why such a hydroxy compound has the effect is not clear, the improvement in conductivity is considered to be related to appropriate molecular weight, high density of an OH group with respect to the molecular weight, and being a solid state at a room temperature.

During manufacturing the electrolytic capacitor, the hydroxy compound is exposed to various thermal atmospheres. When exposed to a thermal atmosphere, the hydroxy compound having a melting point ranging from 40° C. to 150° C., inclusive, never rapidly volatilizes. Therefore, such a hydroxy compound is less likely to give stress on the conductive polymer and/or a member around the conductive polymer. Further, the hydroxy compound having a melting point ranging from 40° C. to 150° C., inclusive, is solid at a room temperature, so that the hydroxy compound is less likely to move in the conductive polymer layer. Therefore, the hydroxy compound is likely to be uniformly distributed in the conductive polymer layer. Accordingly, it is considered that the conductive polymer layer that is homogeneous and high in crystallinity can be formed and the conductivity can be improved.

The hydroxy compound that is solid at a room temperature is less likely to move in the conductive polymer layer, so that the hydroxy compound is also less likely to exteriorly ooze from the conductive polymer layer. Accordingly, the hydroxy compound less affects surroundings of the solid electrolyte layer. In contrast, a hydroxy compound having a melting point of less than 40° C. is likely to ooze from the solid electrolyte layer. Therefore, the hydroxy compound sometimes infiltrates between layers of a cathode member to cause peeling of the layers from one another.

The hydroxy compound is preferred to have a boiling point of 300° C. or less. The hydroxy compound that has not excessively high boiling point moderately volatilizes during formation of the solid electrolyte layer. This moderate volatilization of the hydroxy compound improves reflow resistance of the electrolytic capacitor. In addition, the hydroxy compound having a melting point ranging from 40° C. to 150° C., inclusive, and a boiling point of 300° C. or less moderately remains in the solid electrolyte layer. The hydroxy compound remaining in the solid electrolyte layer is considered to further increase the crystallinity of the conductive polymer.

The hydroxy compound has at least two hydroxy groups in a single molecule of the hydroxy compound. From the viewpoint of setting the melting point and the boiling point to a more preferable range, however, the hydroxy compound has preferably 5 or less hydroxy groups, more preferably 4 or less hydroxy groups, further preferably 3 or less and 2 or more hydroxy groups.

The hydroxy compound has a melting point ranging from 40° C. to 150° C., inclusive. In terms of allowing the hydroxy compound to maintain a solid state, however, the hydroxy compound has a melting point of preferably 50° C. or more, and more preferably 55° C. or more. In addition, in terms of facilitating liquefaction of the hydroxy compound that is exposed to a thermal atmosphere and increasing an effect of improving the crystallinity of the conductive polymer, the hydroxy compound has a melting point of preferably 130° C. or less, and more preferably 110° C. or less. The hydroxy compound may have a boiling point of 300° C. or less and may have 250° C. or less.

A molecular weight of the hydroxy compound is not particularly limited, and may be selected so that the melting point and the boiling point of the hydroxy compound are in the above ranges. Specific examples of the hydroxy compound include erythritol, neopentyl glycol, catechol, xylitol, trimethylolpropane, sorbitol, pyrogallol, pinacol, and 2,5-hexane diol. These hydroxy compounds may be used alone or in combination of two or more hydroxy compounds. Among these hydroxy compounds, neopentyl glycol, 2,5-hexane diol, catechol, and trimethylolpropane are preferred, for example.

A ratio of the hydroxy compound included in the solid electrolyte layer ranges preferably from 5 parts by mass to 500 parts by mass, inclusive, further preferably from 10 parts by mass to 100 parts by mass, inclusive, with respect to 100 parts by mass of the conductive polymer (e.g., a total of the first conductive polymer and the second conductive polymer) included in the solid electrolyte layer.

When the first conductive polymer layer and the second conductive polymer layer each include a hydroxy compound, a concentration of the hydroxy compound included in the second conductive polymer layer is desired to be higher than a concentration of the hydroxy compound included in the first conductive polymer layer. That is, the hydroxy compound is preferred to be locally present in the second conductive polymer layer. The hydroxy compound included in the first conductive polymer layer and the hydroxy compound included in the second conductive polymer layer may be the same or different.

With the hydroxy compound locally present in the second conductive polymer layer, and not present or present at a low concentration in the first conductive polymer layer, deterioration of the dielectric layer is suppressed. As a result, the leakage current is reduced, and withstand voltage characteristics are likely to be improved. These effects are brought about because it is possible to more reduce stress on the dielectric layer caused by the hydroxy compound when the electrolytic capacitor is exposed to a high temperature. Usually, the surface of the anode body is roughened, so that a fine structure is formed. Therefore, stress on the dielectric layer may possibly damage the fine structure.

The hydroxy compound that is a solid state at a room temperature never rapidly volatilizes but generates expanding pressure in a high temperature environment. Accordingly, from the viewpoint of protecting the dielectric layer, the hydroxy compound is preferred not to be present in the first conductive polymer layer most adjacent to the dielectric layer. When the first conductive polymer layer includes a large amount of the hydroxy compound, stress imparted to the first conductive polymer layer and the dielectric layer increases during a step of manufacturing the electrolytic capacitor or reflow.

(First Conductive Polymer Layer)

The first conductive polymer layer includes a first conductive polymer. And the first conductive polymer layer may include a hydroxy compound, and may further include a dopant (hereinafter, a first dopant).

(First Conductive Polymer)

As the first conductive polymer, a publicly known polymer, e.g., a n-conjugated conductive polymer, used for an electrolytic capacitor, can be used. Examples of such a conductive polymer include a polymer having, as a basic skeleton, for example, polypyrrole, polythiophene, polyfuran, polyaniline, polyacetylene, polyphenylene, polyphenylene vinylene, polyacene, and/or polythiophene vinylene. Such a polymer includes a homopolymer, a copolymer of two or more kinds of monomers, and derivatives (e.g., a substitute having a substituent) of these polymers. For example, polythiophene includes poly(3,4-ethylenedioxythiophene) and the like. Such a conductive polymer has high conductivity and is excellent in ESR characteristics. These conductive polymers may be used alone or in combination of two or more conductive polymers. A weight average molecular weight of the conductive polymer is not particularly limited and ranges, for example, from 1,000 to 1,000,000, inclusive.

(First Dopant)

As the first dopant, for example, a low-molecular-weight compound (low-molecular-weight dopant) that has an acid group (or an anionic group) or a polymer compound (hereinafter, a first polymer dopant) that has an acid group (or an anionic group) is used. The first conductive polymer layer that is homogeneous can be easily formed by using the polymer dopant. As the first dopant, one dopant can be used alone, or two or more dopants can be used in combination.

As the low-molecular-weight dopant, there can be used a low-molecular-weight compound (monomer compound) having an anionic group such as a sulfonate group, a carboxyl group, a phosphate group, and/or a phosphonate group. As such a compound, there can be used, for example, a cyclic compound in which an anionic group is bonded to an aromatic ring (e.g., a $C_{6-14}$ aromatic ring) of benzene, naphthalene, anthracene, or the like, or to a fused ring of an aromatic ring and an aliphatic ring. As the anionic group, a sulfonate group is preferred, and a combination of the sulfonate group with an anionic group other than the sulfonate group is also acceptable. At least one of the aromatic ring and the aliphatic ring that constitute the cyclic compound may also include a substituent (e.g., an alkyl group such as a methyl group, and an oxo group (=O)), other than the anionic group. Specific examples of such a compound include alkylbenzenesulfonic acids such as benzenesulfonic acid and p-toluenesulfonic acid, naphthalenesulfonic acid, and anthraquinonesulfonic acid.

As the first polymer dopant, there can be used, for example, a polymer compound having an anionic group such as a sulfonate group, a phosphate group, and/or a phosphonate group. Among the anionic groups, a sulfonate group is preferred. As the first polymer dopant having a sulfonate group, there can be exemplified a homopolymer or a copolymer of a monomer having a sulfonate group (e.g., a vinyl monomer or diene monomer having a sulfonate group). Examples of the vinyl monomer having a sulfonate group include aliphatic vinyl monomers having a sulfonate group, such as vinylsulfonic acid, allylsulfonic acid, and 2-acrylamido-2-methylprop anesulfonic acid, and aromatic vinyl monomers having a sulfonate group, such as styrenesulfonic acid. These vinyl monomers can be used alone or in combination of two or more vinyl monomers. The copolymer may be a copolymer formed of two or more kinds of monomers having a sulfonate group or a copolymer formed of a monomer having a sulfonate group and another monomer.

A weight average molecular weight of the first polymer dopant ranges, for example, from 1,000 to 1,000,000, inclusive, preferably from 10,000 to 500,000, inclusive. The use of the first polymer dopant having such a molecular weight facilitates homogenization of the first conductive polymer layer. In the cases of the homopolymer and the copolymer of a monomer having a sulfonate group, the weight average molecular weight more preferably ranges from 10,000 to 500,000, inclusive.

A ratio of the dopant included in the first conductive polymer layer ranges preferably from 10 parts by mass to 1,000 parts by mass, inclusive, further preferably from 50 parts by mass to 200 parts by mass, inclusive, with respect to 100 parts by mass of the first conductive polymer.

(Second Conductive Polymer Layer)

The second conductive polymer layer includes a second conductive polymer and is preferred to include a dopant (hereinafter, a second dopant) and a hydroxy compound. Addition of the hydroxy compound at least to the second conductive polymer layer increases an effect of improving the conductivity of the solid electrolyte layer.

(Second Conductive Polymer)

As the second conductive polymer, a publicly known polymer used for an electrolytic capacitor can be used. For example, a polymer can be appropriately selected and used from the conductive polymers exemplified for the first conductive polymer. A weight average molecular weight of the second conductive polymer can also be appropriately selected from the ranges exemplified for the first conductive polymer. The first conductive polymer and the second conductive polymer may be the same or different.

(Second Dopant)

As the second dopant, a publicly known dopant used in an electrolytic capacitor can be used. Specifically, a dopant can be appropriately selected from the dopants exemplified for the first conductive polymer layer. The first dopant and the second dopant may be the same or different. As the second dopant, it is desired to use a polymer dopant (hereinafter, a second polymer dopant).

A ratio of the second polymer dopant included in the second conductive polymer layer ranges preferably from 10 parts by mass to 1,000 parts by mass, inclusive, further preferably from 50 parts by mass to 200 parts by mass, inclusive, with respect to 100 parts by mass of the second conductive polymer.

An average thickness of the second conductive polymer layer ranges, for example, from 5 µm to 100 µm, inclusive, preferably from 10 µm to 50 µm, inclusive. A ratio of the average thickness of the second conductive polymer layer to an average thickness of the first conductive polymer layer is, for example, 5 times or more, preferably 10 times or more. The second conductive polymer layer having an average thickness in such ranges further facilitates an increase in conductivity of the solid electrolyte layer.

In the exemplary embodiment described above, the solid electrolyte layer that has a two-layer structure including the first conductive polymer layer and the second conductive polymer layer has been described. The solid electrolyte layer, however, may have a three or more-layer structure. When the solid electrolyte layer has a three or more-layer structure, the layers other than the first conductive polymer layer can be considered to be all the second conductive polymer layers.

The solid electrolyte layer may further include, as necessary, a publicly known additive or a publicly known conductive material (e.g., manganese dioxide and a TCNQ complex salt) other than the conductive polymer, or both a publicly known additive and a publicly known conductive material other than the conductive polymer.

A third layer may be interposed between the dielectric layer and the first conductive polymer layer or between the first conductive polymer layer and the second conductive polymer layer. Alternatively, third layers may be interposed both between the dielectric layer and the first conductive polymer layer and between the first conductive polymer layer and the second conductive polymer layer, respectively. Examples of the third layer include a layer for enhancing a covering property of the first conductive polymer layer or the second conductive polymer layer, and a layer for enhancing adhesion between the layers.

(Method for Manufacturing Electrolytic Capacitor)

A method for manufacturing the electrolytic capacitor according to the one exemplary embodiment of the present disclosure includes a first step of preparing an anode body including a dielectric layer and a second step of forming a solid electrolyte layer covering at least a part of the dielectric layer and including a hydroxy compound.

Here, the second step includes a step A of forming a first conductive polymer layer and a step B of forming a second conductive polymer layer.

Hereinafter, the steps are described in more detail.

(First Step)

In the first step, first, an anode body is formed by a publicly known method according to a kind of the anode body. The anode body that is a porous body can be prepared by, for example, roughening a surface of a foil- or plate-shaped base material formed from a conductive material. The roughening is satisfactory as long as irregularities are formed on the surface of the base material, and may be performed by etching the surface of the base material.

Next, a dielectric layer is formed on the anode body. The dielectric layer is formed by anodizing a surface of the anode body. The anodization can be performed by a publicly known method, for example, an anodizing treatment. The anodizing treatment can be performed by, for example, immersing the anode body in an anodizing solution to impregnate, with the anodizing solution, the surface (surface including an inner wall surface of pores of the porous body) of the anode body, and applying a voltage between the anode body as an anode and a cathode immersed in the anodizing solution. As the anodizing solution, it is preferred to use, for example, an aqueous solution of phosphoric acid, an aqueous solution of ammonium phosphate, or an aqueous solution of ammonium adipate.

(Second Step)

(Step A) In the step A, by using a first treatment solution, a first conductive polymer layer including a first conductive polymer is formed so as to cover at least a part of the dielectric layer. For example, the anode body including the dielectric layer is immersed in the first treatment solution to impregnate the first treatment solution into the inner wall surface of irregularities in a spongy structure of the dielectric layer. Then, the anode body is take out from the first treatment solution and dried. During the drying, the anode body may be heated as necessary. A method for impregnating the first treatment solution into the inner wall surface of the irregularities in the spongy structure of the dielectric layer is not particularly limited.

As the first treatment solution, there can be used, for example, a solution or a dispersion liquid containing the first conductive polymer, a first polymer dopant, and a first solvent (or a dispersion medium). The use of such a solution or a dispersion liquid as the first treatment solution enables easy formation of the first conductive polymer layer stable in quality. A form of a dispersoid (the first conductive polymer and/or the first polymer dopant) in the dispersion liquid is not particularly limited, but the dispersoid is preferred to be particulate. An average particle size of particles of the dispersoid in the dispersion liquid preferably ranges from 5 nm to 100 nm, inclusive. The average particle size can be measured, for example, from a particle size distribution obtained by a dynamic light scattering method.

The first treatment solution may further contain a hydroxy compound. When a second treatment solution described below contains the hydroxy compound, however, a concentration of the hydroxy compound in the first treatment solution is desired to be lower than a concentration of the hydroxy compound in the second treatment solution. The first treatment solution does not necessarily contain the hydroxy compound.

As the solvent (or the dispersion medium) contained in the first treatment solution, there can be exemplified water, an organic medium, and a mixture of water and the organic medium. Examples of the organic medium include aliphatic alcohols having 1 to 5 carbon atoms (e.g., methanol, ethanol, propanol, and 1-butanol); aliphatic ketones such as acetone; nitriles such as acetonitrile and benzonitrile; amides such as N,N-dimethylformamide; and sulfoxides such as dimethyl sulfoxide.

The first conductive polymer layer may also be a polymerized film formed by impregnating the anode body including the dielectric layer with the first treatment solution containing a raw material of the first conductive polymer, followed by polymerization (chemical polymerization or electrolytic polymerization). Examples of the raw material of the first conductive polymer include a precursor of the first conductive polymer, for example, a monomer constituting the first conductive polymer and/or an oligomer in which some monomers are linked to each other.

For formation of the polymerized film, an oxidant is used for polymerizing the raw material of the first conductive polymer. The oxidant may be added to the first treatment solution. Alternatively, the oxidant may be applied to the anode body before or after the anode body on which the dielectric layer is formed is immersed in the first treatment solution. Examples of such an oxidant include a metal sulfonate. The metal sulfonate also has a function as a dopant in addition to a function as an oxidant. As a moiety constituting a sulfonic acid of the metal sulfonate, there can be exemplified an alkyl sulfonic acid and/or an aromatic sulfonic acid (e.g., benzenesulfonic acid, toluenesulfonic acid, and naphthalenedisulfonic acid). As a metal moiety constituting a metal salt, there can be exemplified iron (III), copper (II), chromium (IV) and/or zinc (II).

The first treatment solution used for forming the polymerized film can also contain a component (e.g., a low-molecular-weight dopant) other than the raw material of the first conductive polymer and the oxidant, as necessary.

(Step B)

In the step B, after the step A, at least a part of the first conductive polymer layer is covered with a second treatment solution, and a second conductive polymer layer that includes a second conductive polymer is formed. The step B can be performed in the same manner as in the step A or by a procedure according to the step A except for using the second treatment solution.

As the second treatment solution, there can be used, for example, a solution or a dispersion liquid containing the second conductive polymer, a second polymer dopant, and a second solvent (or a dispersion medium). The second treatment solution is preferred to contain a hydroxy compound. A form of a dispersoid (the second conductive polymer and/or the second polymer dopant) in the dispersion liquid is not particularly limited, but the dispersoid is preferred to be particulate, and an average particle size of particles of the dispersoid may be larger or smaller than the average particle size of the particles of the dispersoid in the first treatment solution.

The second solvent (or the dispersion medium) can be appropriately selected from those exemplified for the first treatment solution. The first solvent (or the dispersion medium) and the second solvent (or the dispersion medium) may be the same or different.

The second conductive polymer layer may be a polymerized film formed by polymerizing a raw material of the second conductive polymer. The second treatment solution for forming the polymerized film contains the raw material of the second conductive polymer and is preferred to further contain the hydroxy compound. Examples of the raw material of the second conductive polymer include a precursor of the second conductive polymer, for example, a monomer constituting the second conductive polymer and/or an oligomer in which some monomers are linked to each other.

Similarly to a case of the first conductive polymer layer, an oxidant is used for polymerizing the raw material of the second conductive polymer for formation of the polymerized film. The oxidant may be added to the second treatment solution or may be applied to the anode body before or after the immersion of the anode body in the second treatment solution. The oxidant can be appropriately selected from those exemplified for the first conductive polymer layer. The second treatment solution used for forming the polymerized film can also contain a component (e.g., a low-molecular-weight dopant) other than the raw material of the second conductive polymer and the oxidant, as necessary.

When the first treatment solution or the second treatment solution, or both the first treatment solution and the second treatment solution are a solution or dispersion liquid containing the conductive polymer, the polymer dopant, the hydroxy compound, and the solvent (or the dispersion medium), the anode body is desired to be heated at a temperature ranging from 100° C. to 200° C., inclusive, over a period ranging from 1 minute to 1 hour during drying after immersed in and taken out from the first treatment solution or the second treatment solution, or both the first treatment solution and the second treatment solution. With this procedure, the hydroxy compound slowly volatilizes while acting to the conductive polymer during the period of heating, and an appropriate amount of the hydroxy compound remains in the conductive polymer layer. The hydroxy compound sufficiently acts to the conductive polymer to increase the crystallinity of the conductive polymer. An increase in the crystallinity of the conductive polymer improves film quality of the conductive polymer layer, improves the conductivity, and makes the solid electrolyte layer less likely to generate a cleavage. Accordingly, a decrease in conductivity during use of the electrolytic capacitor can also be suppressed.

(Degree of Sulfonation of Dopant)

From the viewpoint of efficiently doping the conductive polymer and imparting sufficient conductivity to the conductive polymer, the polymer dopant is desired to have at least a sulfonate group. In addition, from the viewpoint of stabilizing a physical property (e.g., viscosity and a pot life) of the treatment solution and improving dispersibility of the conductive polymer contained in the treatment solution, a degree of sulfonation of the second polymer dopant included at least in the second conductive polymer layer may be set to range from 50% to 90%, inclusive.

The term degree of sulfonation of the polymer dopant means a proportion (mol %) of a repeating unit having a sulfonate group (including a salt or ester of the sulfonate group) in whole repeating units constituting a molecule of the polymer dopant. The polymer dopant may have two or more sulfonate groups (including a salt or ester of the sulfonate group) per repeating unit, but is preferred to have one sulfonate group (including a salt or ester of the sulfonate group) per repeating unit.

The first conductive polymer layer and the second conductive polymer layer may include a plurality of polymer dopants having different degrees of sulfonation. A decrease in degree of sulfonation is likely to decrease dispersibility of the dopant, sometimes making it difficult to form the conductive polymer layer that has a uniform distribution of the dopant and the conductive polymer in the conductive polymer layer. A polymer dopant being low in degree of sulfonation and a polymer dopant being high in degree of sulfonation are used in combination to give more homogeneous film quality, increase the conductivity, and facilitate reduction of the ESR.

For example, the first conductive polymer layer and the second conductive polymer layer may include a polymer dopant having a degree of sulfonation $S_1$, and the first conductive polymer layer or the second conductive polymer layer may further include a polymer dopant having a degree of sulfonation $S_2$. Here, the degrees of sulfonation $S_1$ and $S_2$ satisfy $S_1 < S_2$. Alternatively, the first conductive polymer layer and the second conductive polymer layer may include a polymer dopant having a degree of sulfonation $S_1$, and the first conductive polymer layer and the second conductive polymer layer may further include a polymer dopant having a degree of sulfonation $S_2$. For example, when the degree of sulfonation $S_1$ ranges from 50% to 90%, inclusive, the degree of sulfonation $S_2$ is preferred to exceed 90%.

The polymer dopant having the degree of sulfonation $S_2$ is preferably an aromatic vinyl polymer having a sulfonate group, such as polystyrenesulfonic acid, and the polymer dopant having the degree of sulfonation $S_1$ is preferably a copolymer that includes a monomer unit having a sulfonate group and a monomer unit having a carboxyl group because such a copolymer has a high restoration property of the dielectric layer and is expected to give an effect of suppressing the leakage current.

Examples of the monomer unit having a sulfonate group include vinylsulfonic acid, allylsulfonic acid, 2-acrylamido-2-methylprop anesulfonic acid, styrenesulfonic acid, and isoprenesulfonic acid. These monomer units can be used alone or in combination of two or more monomer units.

Examples of the monomer unit having a carboxyl group include acrylic acid, methacrylic acid, maleic acid, and fumaric acid. The carboxyl group may form a salt or a derivative having an ester bond, and an ester group included in a derivative may have a carboxyl group. These monomer units can be used alone or in combination of two or more monomer units.

(Water-Soluble Polymer)

The solid electrolyte layer may further include a water-soluble polymer as a component other the components described above. The water-soluble polymer has high affinity for the conductive polymer so as to suppress formation of a crack in the conductive polymer layer and densify the film. Accordingly, the conductivity can be increased and the ESR can be more reduced.

The water-soluble polymer is, for example, a copolymer that includes a hydrophilic monomer unit having a hydrophilic group. The hydrophilic group is at least one selected from the group consisting of a carboxyl group, an acid anhydride group, a phenolic hydroxy group, and a $C_{2-3}$ alkylene oxide group. The $C_{2-3}$ alkylene oxide group has a chain form. The water-soluble polymer facilitates formation of a three-dimensional network of a polymer chain when the water-soluble polymer is a copolymer as compared with when the water-soluble polymer is a homopolymer. Further, the water-soluble polymer that has the hydrophilic group described above has high affinity for the conductive polymer as compared with, for example, polyvinyl alcohol. The copolymer is preferred to be a random copolymer.

Hereinafter, a first hydrophilic monomer unit refers to a hydrophilic monomer unit having at least one selected from the group consisting of a carboxyl group, an acid anhydride group, and a phenolic hydroxy group.

A first hydrophilic monomer corresponding to the first hydrophilic monomer unit is preferred to be at least one selected from the group consisting of acrylic acid, 2-$C_{1-4}$ alkyl-2-propenoic acid, maleic acid, maleic anhydride, and fumaric acid.

A second hydrophilic monomer unit refers to a hydrophilic monomer unit having a $C_{2-3}$ alkylene oxide group. A second hydrophilic monomer corresponding to the second hydrophilic monomer unit is preferred to be ethylene oxide and propylene oxide.

The water-soluble polymer can further include a third monomer unit other than the monomer units described above. A third monomer corresponding to the third monomer unit is at least one selected from the group consisting of a vinyl monomer having an ester group and an aromatic vinyl monomer. More specifically, there can be exemplified an acrylic acid ester, a methacrylic acid ester, vinyl acetate, acrylonitrile, styrene, and vinyltoluene.

Specific examples of the water-soluble polymer include an acrylic acid-methacrylic acid copolymer, an acrylic acid-maleic acid copolymer, and a vinylphenol-styrene copolymer.

The hydrophilic monomers corresponding to the hydrophilic monomer units include the hydrophilic group described above, and a polymerizable group or a polymerizable moiety. The hydrophilic monomer may have the hydrophilic group and the polymerizable group directly linked to each other or may have the hydrophilic group, the polymerizable group (or the polymerizable moiety), and a linking group (e.g., an ethylene group, a propylene group, a cyclohexanediyl group, and a phenylene group) that links these groups. The hydrophilic monomer may be any of an aliphatic monomer, an alicyclic monomer, and an aromatic monomer. When the water-soluble polymer including an aromatic hydrophilic monomer unit is used, the affinity of the water-soluble polymer for the conductive polymer increases due to presence of an aromatic ring, so that film formability of the conductive polymer layer is expected to be improved.

A proportion of the hydrophilic monomer unit (particularly, the first hydrophilic monomer) in the copolymer is, for example, 30 mol % or more, preferably 40 mol % or more, and may also be 65 mol % or more. A weight average molecular weight of the water-soluble polymer ranges, for example, from 10,000 to 500,000, inclusive. The water-soluble polymer having such a weight average molecular weight can further increase a reinforcing effect of the solid electrolyte layer to suppress the leakage current and facilitate reduction of the ESR. The water-soluble polymer is preferred to dissolve in 100 g of water at 25° C., in an amount ranging, for example, from 1 g by mass to 5 g by mass, inclusive.

When the water-soluble polymer includes two or more first hydrophilic monomer units, it is preferred that a proportion of one first hydrophilic monomer unit in the water-soluble polymer range 20 mol % to 80 mol %, inclusive, and the other one or more first hydrophilic monomer units constitute the remaining part of the water-soluble polymer.

When the solid electrolyte layer includes the first conductive polymer layer and the second conductive polymer layer, the first conductive polymer layer is desired not to include the water-soluble polymer other than the first dopant, from the viewpoint of increasing coverage of the dielectric layer. Even when the first conductive polymer layer includes the water-soluble polymer, a content of the water-soluble polymer in the first conductive polymer layer is preferred to be lower than a content of the water-soluble polymer included in the second conductive polymer layer.

A ratio of the water-soluble polymer ranges, for example, from 1 part by mass to 100 parts by mass, inclusive, with respect to 100 parts by mass of the conductive polymer (e.g., a total of the first conductive polymer and the second conductive polymer) included in the solid electrolyte layer.

(Amine Compound)

The solid electrolyte layer may include an amine compound. The amine compound increases the covering property of the solid electrolyte layer to give an effect to improve the withstand voltage of the electrolytic capacitor and reduce the ESR. The amine compound is preferred to be an organic compound having, for example, a primary amino group, a secondary amino group, a tertiary amino group, or a quaternary amino group. As a preferable amine compound, there can be exemplified a primary to tertiary amine having 1 to 3 substituents (e.g., an alkyl group, a cycloalkyl group, and an aryl group) at a nitrogen atom, and a diamine that may have 1 or 2 alkyl groups at a nitrogen atom.

Examples of the alkyl group include $C_{1-16}$ alkyl groups such as methyl, ethyl, 1-propyl, 2-propyl, 1-butyl, tert-butyl, hexyl, 2-ethylhexyl, octyl, decyl, and dodecyl. The alkyl group may be a straight or branched chain. Examples of the cycloalkyl group include $C_{4-10}$ cycloalkyl groups such as cyclopentyl, cyclohexyl, and cyclooctyl. Examples of the aryl group include $C_{6-14}$ aryl groups such as phenyl and naphthyl. The alkyl group, the cycloalkyl group, and the aryl group may each have a substituent such as a hydroxy group and/or an alkoxy group.

Examples of the primary amine include $C_{4-16}$ alkylamines such as octyl amine and decyl amine Examples of the tertiary amine include N,N-di-$C_{1-10}$ alkyl-N—$C_{4-16}$ alkylamines such as N,N-dimethyl-octylamine, N,N-di-$C_{4-16}$ alkyl-N—$C_{1-10}$ alkylamines, and tri-$C_{4-16}$ alkylamines Examples of the diamine include a diaminoalkane, a diaminocycloalkane, and a diaminoarene. These diamines may have a substituent such as a hydroxy group and/or an alkoxy group at an alkane, cycloalkane, or arene moiety. Examples of the diaminoalkane include 1,4-diaminobutane, 1,6-diaminohexane, 1,8-diaminooctane, and 1,10-diaminodecane. Each of nitrogen atoms of these diamines may have 1 or 2 alkyl groups. Examples of the alkyl group include those exemplified above.

A ratio of the amine compound ranges, for example, from 10 parts by mass to 100 parts by mass, inclusive, with respect to 100 parts by mass of the conductive polymer (e.g., the total of the first conductive polymer and the second conductive polymer) included in the solid electrolyte layer.

(Step of Forming Cathode Layer)

The method for manufacturing the electrolytic capacitor can further include a step (third step) of forming a cathode layer. In the third step, a cathode layer is formed by sequentially stacking a carbon layer and a silver paste layer on a surface of the solid electrolyte layer obtained in the second step.

The carbon layer can be formed by immersing the anode body including the dielectric layer on which the solid electrolyte layer is formed in an aqueous dispersion liquid of carbon (e.g., a conductive carbon material such as graphite), or by applying a carbon paste to the surface of the solid electrolyte layer. The carbon paste is a composition containing a conductive carbon material such as graphite. A thickness of the carbon layer ranges, for example, from 1 μm to 20 μm, inclusive.

The silver paste is a composition containing silver particles and a resin (binder resin). As the resin, although a thermoplastic resin can be used, a thermosetting resin is preferred to be used. A thickness of the silver paste layer ranges, for example, from 50 μm to 100 μm, inclusive.

The cathode layer is not limited to this configuration and is satisfactory as long as the cathode layer is configured to have a function of power collection.

Hereinafter, the present disclosure is specifically described with reference to examples and comparative examples. The present disclosure, however, is not limited to the examples below.

Example 1

Electrolytic capacitor 1 shown in FIG. 1 was produced in the manner described below, and characteristics of the electrolytic capacitor were evaluated.

(1) Step of Preparing Anode Body 2

Both surfaces of an aluminum foil (thickness: 100 μm) as a base material were roughened by etching so that produce anode body 2 was produced.

(2) Step of Forming Dielectric Layer 3

A part of anode body 2 at a side of one end (a part from a separation part to the one end) was immersed in an anodizing solution, and a 70 V DC voltage was applied for 20 minutes to form dielectric layer 3 including aluminum oxide.

(3) Step of Forming First Conductive Polymer Layer 4a (step A)

A 3,4-ethylenedioxythiophene monomer was added, under stirring, to an aqueous solution of polystyrenesulfonic acid (weight average molecular weight: 75,000), and then oxidants (iron(III) sulfate and sodium persulfate) were added to the solution to carry out chemical oxidative polymerization. The obtained polymerization liquid was subjected to filtration by ion-exchange equipment to remove impurities. Thus, a solution (PEDOT/PSS) that contained poly(3, 4-ethylenedioxythiophene) (PEDOT) as a first conductive polymer and polystyrenesulfonic acid (PSS) as a first polymer dopant was obtained.

Purified water was added to the obtained solution, and the resultant mixture was homogenized by a high-pressure homogenizer, and then the resultant mixture was further subjected to filtration by a filter so that a first treatment solution (dispersion liquid) was prepared.

Anode body 2 on which dielectric layer 3 was formed in the above step (2) was immersed in the first treatment solution. And then anode body 2 was taken out from the first treatment solution, and further dried at 120° C. for a period ranging from 10 minutes to 30 minutes. The immersion in the first treatment solution and the drying were repeated again, so that first conductive polymer layer 4a was formed so as to cover a surface of dielectric layer 3. An average thickness of first conductive polymer layer 4a measured by a scanning electron microscope (SEM) was about 1 μm.

(4) Step of forming second conductive polymer layer 4b (step B)

In the same manner as in the above step (3), a solution that contained PEDOT as a second conductive polymer and PSS (weight average molecular weight: 75,000) as a second polymer dopant was obtained. Purified water was added to the obtained solution, and the resultant mixture was homogenized by a high-pressure homogenizer, and then the resultant mixture was further subjected to filtration by a filter so that a dispersion liquid was prepared. Neopentyl glycol (NPG, melting point 128° C., boiling point 210° C.) as a hydroxy compound was added to the obtained dispersion liquid and stirred to prepare a second treatment solution. A ratio of the hydroxy compound (NPG) in the second treatment solution was set to 70 parts by mass with respect to 100 parts by mass of PEDOT.

Anode body 2 that included dielectric layer 3 covered with first conductive polymer layer 4a, which is obtained in the above step (3), was immersed in the second treatment solution. And then anode body 2 was taken out from the second treatment solution, and further dried at 150° C. for a period ranging from 10 minutes to 30 minutes. The immersion in the second treatment solution and the drying were alternately repeated another two times so that second conductive polymer layer 4b was formed so as to cover a surface of first conductive polymer layer 4a. An average thickness of second conductive polymer layer 4b was measured in the same manner as in first conductive polymer layer 4a, and the average thickness was about 30 μm.

In this way, solid electrolyte layer 4 including first conductive polymer layer 4a and second conductive polymer layer 4b was formed so as to cover the surface of dielectric layer 3.

(5) Step of Forming Cathode Layer 5

Anode body 2 that included dielectric layer 3 covered with solid electrolyte layer 4, which is obtained in the above step (4), was immersed in a dispersion liquid obtained by dispersing graphite particles in water. And then anode body 2 was taken out from the dispersion liquid, and dried to form carbon layer 5a. The drying was performed at a temperature ranging from 130° C. to 180° C., inclusive, for a period ranging from 10 minutes to 30 minutes.

Next, a silver paste including silver particles and a binder resin (epoxy resin) was applied to a surface of carbon layer 5a and heated at a temperature ranging from 150° C. to 200° C., inclusive, for a period ranging from 10 minutes to 60 minutes to cure the binder resin, so that silver paste layer 5b was formed. Thus, cathode layer 5 was formed that was configured to include carbon layer 5a and silver paste layer 5b.

As described above, capacitor element 11 was produced.

(6) Assembling of Electrolytic Capacitor

Cathode layer 5 of capacitor element 11 that was obtained in the above step (5) was joined with first end 14a of cathode terminal 14 with conductive adhesive material 17. The other end of anode body 2 that protruded from capacitor element 11 was joined with first end 13a of anode terminal 13 by laser welding.

Next, resin outer packing 12 made of an insulating resin was formed around capacitor element 11 by a transfer molding method. In forming the resin outer packing, second end 13b of anode terminal 13 and second end 14b of cathode terminal 14 were made to be drawn out from resin outer packing 12.

Thus, electrolytic capacitor 1 was completed. In the same manner as described above, a total of 250 electrolytic capacitors 1 were produced.

(7) Evaluation (a) ESR

From the electrolytic capacitors, 120 electrolytic capacitors were randomly selected, and an ESR value (mΩ) was measured at a frequency of 100 kHz for each of the electrolytic capacitors with an LCR meter for 4-terminal measurement, and an average value was obtained.

(b) Leakage current (LC)

A voltage of 10 V was applied between anode body 2 and cathode layer 5 of the electrolytic capacitor and leakage current was measured after 40 seconds of the application. The result was compared with a predetermined reference value to perform quality determination, and then a yield rate was obtained.

Examples 2 to 6

A solid electrolyte layer was formed in the same manner as in Example 1 except for using, in the step B, each of the following hydroxy compounds described below in place of NPG, and an electrolytic capacitor was produced.

Example 2

2,5-hexanediol (HEDOL, melting point 50° C. to 53° C., boiling point 212° C. to 215° C.)

Example 3

Trimethylolpropane (TMP, melting point 58° C., boiling point 292° C. to 297° C.)

Example 4

Xylitol (XYTOL, melting point 92° C.)

Example 5

Catechol (CTEOL, melting point 106° C., boiling point 246° C.)

Example 6

A solid electrolyte layer was formed in the same manner as in Example 1 except for changing the ratio of the hydroxy compound (NPG) in the second treatment solution to 20 parts by mass, with respect to 100 parts by mass of PEDOT, and an electrolytic capacitor was produced.

Example 7

A solid electrolyte layer was formed in the same manner as in Example 1 except for changing the ratio of the hydroxy compound (NPG) in the second treatment solution to 200 parts by mass, with respect to 100 parts by mass of PEDOT, and an electrolytic capacitor was produced.

Example 8

A solid electrolyte layer was formed in the same manner as in Example 3 except for also adding the hydroxy compound (TMP) to the first treatment solution at a ratio of 20 parts by mass with respect to 100 parts by mass of PEDOT, and an electrolytic capacitor was produced.

Example 9

A solid electrolyte layer was formed in the same manner as in Example 8 except for changing the ratio of the hydroxy compound (TMP) in the first treatment solution to 70 parts by mass, with respect to 100 parts by mass of PEDOT, and an electrolytic capacitor was produced.

Example 10

A solid electrolyte layer was formed in the same manner as in Example 8 except for changing the ratio of the hydroxy compound (TMP) in the first treatment solution to 200 parts by mass, with respect to 100 parts by mass of PEDOT, and an electrolytic capacitor was produced.

Example 11

A solid electrolyte layer was formed in the same manner as in Example 9 except for not adding the hydroxy compound (TMP) to the second treatment solution, and an electrolytic capacitor was produced.

Example 12

A solid electrolyte layer was formed in the same manner as in Example 1 except for further adding an amine compound (triethylamine) to the second treatment solution at a ratio of 50 parts by mass with respect to 100 parts by mass of PEDOT, and an electrolytic capacitor was produced.

Example 13

A solid electrolyte layer was formed in the same manner as in Example 1 except for further adding a water-soluble polymer (polyacrylic acid) to the second treatment solution at a ratio of 50 parts by mass with respect to 100 parts by mass of PEDOT, and an electrolytic capacitor was produced.

Example 14

A solid electrolyte layer was formed in the same manner as in Example 3 except for changing the second polymer dopant in the second treatment solution to the following copolymer (degree of sulfonation 90%, D-1), and an electrolytic capacitor was produced. As the second polymer dopant (D-1), a copolymer of styrenesulfonic acid and acrylic acid was used.

Example 15

A solid electrolyte layer was formed in the same manner as in Example 14 except for changing the degree of sulfonation of the copolymer as the second polymer dopant to 70% (D-2), and an electrolytic capacitor was produced.

Comparative Example 1

A solid electrolyte layer was formed in the same manner as in Example 1 except for not adding the hydroxy compound (NPG) to the second treatment solution, and an electrolytic capacitor was produced.

Comparative Example 2

A solid electrolyte layer was formed in the same manner as in Example 1 except for using ethylene glycol (EG, melting point −13° C., boiling point 196° C.) in place of NPG, and an electrolytic capacitor was produced.

Comparative Example 3

A solid electrolyte layer was formed in the same manner as in Example 1 except for using 1,4-butanediol (BDOL, melting point 19° C., boiling point 228° C.) in place of NPG, and an electrolytic capacitor was produced.

Comparative Example 4

A solid electrolyte layer was formed in the same manner as in Example 1 except for using pentaerythritol (PETOL, melting point 250° C., boiling point 419° C.) in place of NPG, and an electrolytic capacitor was produced.

The electrolytic capacitors of Examples 2 to 15 and Comparative Examples 1 to 4 were evaluated in the same manner as in Example 1. Table 1 shows results of all the examples and comparative examples, with Examples 1 to 15 denoted by A1 to A15, respectively, and Comparative Examples 1 to 4 denoted by B1 to B4, respectively.

TABLE 1

| | Evaluation | |
|---|---|---|
| | ESR (mΩ) | LC (%) |
| A1 | 32.5 | 1.5 |
| A2 | 32.0 | 1.0 |
| A3 | 28.7 | 0.7 |
| A4 | 49.2 | 5.0 |
| A5 | 33.0 | 1.4 |
| A6 | 33.4 | 1.1 |
| A7 | 35.2 | 1.5 |
| A8 | 27.7 | 0.9 |
| A9 | 28.0 | 0.7 |
| A10 | 37.9 | 3.0 |
| A11 | 50.2 | 3.2 |
| A12 | 31.1 | 1.0 |
| A13 | 32.3 | 0.9 |
| A14 | 29.9 | 0.1 |
| A15 | 29.5 | 0.1 |
| B1 | 150.0 | 21.1 |
| B2 | 62.6 | 27.3 |
| B3 | 51.1 | 16.9 |
| B4 | 127.0 | 3.9 |

As shown in Table 1, in Comparative Examples 1 to 3, the leakage current is large and the ESR value is remarkably large. These results are considered to be due to bad film quality of the solid electrolyte layer that causes a crack of the solid electrolyte layer, decreasing the conductivity of the solid electrolyte layer. In contrast, in each of the examples, the leakage current is smaller and the ESR value is lower than in Comparative Examples 1 to 3. These results in the examples are considered to be due to improved film quality of the solid electrolyte layer (particularly, the second conductive polymer layer) that causes suppression of the crack, increasing strength of the solid electrolyte layer, compared with in Comparative Examples 1 to 3.

Example 16

A solid electrolyte layer was formed in the same manner as in Example 1 except for also adding the hydroxy compound (NPG) to the first treatment solution at a ratio of 70 parts by mass with respect to 100 parts by mass of PEDOT, and an electrolytic capacitor was produced.

Example 17

A solid electrolyte layer was formed in the same manner as in Example 4 except for also adding the hydroxy compound (XYTOL) to the first treatment solution at a ratio of 70 parts by mass with respect to 100 parts by mass of PEDOT, and an electrolytic capacitor was produced.

Example 18

A solid electrolyte layer was formed in the same manner as in Example 9 except for changing the ratio of the hydroxy compound (TMP) in the first treatment solution and the second treatment solution to 200 parts by mass, with respect to 100 parts by mass of PEDOT, and an electrolytic capacitor was produced.

Example 19

A solid electrolyte layer was formed in the same manner as in Example 9 except for changing the ratio of the hydroxy compound (TMP) in the first treatment solution and the second treatment solution to 300 parts by mass, with respect to 100 parts by mass of PEDOT, and an electrolytic capacitor was produced.

Example 20

A solid electrolyte layer was formed in the same manner as in Example 16 except for further adding an amine compound (triethylamine) to the first treatment solution and the second treatment solution at a ratio of 70 parts by mass with respect to 100 parts by mass of PEDOT, and an electrolytic capacitor was produced.

Example 21

A solid electrolyte layer was formed in the same manner as in Example 16 except for further adding a water-soluble polymer (polyacrylic acid) to the first treatment solution and the second treatment solution at a ratio of 70 parts by mass with respect to 100 parts by mass of PEDOT, and an electrolytic capacitor was produced.

Example 22

A solid electrolyte layer was formed in the same manner as in Example 16 except for changing the first polymer dopant and the second polymer dopant in the first treatment solution and the second treatment solution to the copolymer (degree of sulfonation 90%, D-1) prepared in Example 14, and an electrolytic capacitor was produced.

Comparative Example 5

A solid electrolyte layer was formed in the same manner as in Comparative Example 2 except for also adding the hydroxy compound (EG) to the first treatment solution at a ratio of 70 parts by mass with respect to 100 parts by mass of PEDOT, and an electrolytic capacitor was produced.

Comparative Example 6

A solid electrolyte layer was formed in the same manner as in Comparative Example 3 except for also adding the hydroxy compound (BDOL) to the first treatment solution at a ratio of 70 parts by mass with respect to 100 parts by mass of PEDOT, and an electrolytic capacitor was produced.

Comparative Example 7

A solid electrolyte layer was formed in the same manner as in Comparative Example 4 except for also adding the hydroxy compound (PETOL) to the first treatment solution at a ratio of 70 parts by mass with respect to 100 parts by mass of PEDOT, and an electrolytic capacitor was produced.

The electrolytic capacitors of Examples 16 to 22 and Comparative Examples 5 to 7 were evaluated in the same manner as in Example 1. Table 2 shows results of these examples and comparative examples, with Examples 16 to 22 denoted by A16 to A22, respectively, and Comparative Examples 5 to 7 denoted by B5 to B7, respectively.

TABLE 2

|  | Evaluation | |
|---|---|---|
|  | ESR (mΩ) | LC (%) |
| A16 | 31.6 | 1.2 |
| A17 | 47.5 | 7.9 |
| A18 | 28.8 | 1.5 |
| A19 | 41.2 | 3.8 |
| A20 | 33.5 | 1.6 |
| A21 | 36.1 | 0.5 |
| A22 | 37.0 | 0.1 |
| B5 | 56.3 | 21.1 |
| B6 | 51.1 | 17.6 |
| B7 | 116.1 | 4.6 |

As shown in Table 2, similarly to Example 1, the LC is low and the ESR value is reduced also in Examples 16 to 22 as compared with in Comparative Examples 1, 5, and 6. In Comparative Example 7, the LC is good but the ESR is very large.

The exemplary embodiments disclosed in this specification are considered to be an example and not to be restrictive in all aspects. A scope of the present disclosure is not indicated by the description above but is indicated by claims and is intended to include all changes in meaning and a range that are equivalent to the claims.

The present disclosure can be widely used to suppress the leakage current of the solid electrolytic capacitor and reduce the ESR.

What is claimed is:
1. An electrolytic capacitor comprising:
an anode body including a dielectric layer; and
a solid electrolyte layer covering at least a part of the dielectric layer, wherein:
the solid electrolyte layer includes:
a first conductive polymer layer covering at least a part of the dielectric layer and including a first conductive polymer; and
a second conductive polymer layer covering at least a part of the first conductive polymer layer and including a second conductive polymer,
the second conductive polymer layer is a layer in which the second conductive polymer, a polymer dopant, and a hydroxy compound are mixed,
the hydroxy compound has two or more alcoholic hydroxy groups or two or more phenolic hydroxy groups, the hydroxy compound having a melting point ranging from 40° C. to 150° C., inclusive,
the first conductive polymer layer further includes the hydroxy compound, and
a concentration of the hydroxy compound included in the second conductive polymer layer is higher than a concentration of the hydroxy compound included in the first conductive polymer layer.

2. An electrolytic capacitor, comprising
an anode body including a dielectric layer; and
a solid electrolyte layer covering at least a part of the dielectric layer, wherein:
the solid electrolyte layer includes:
a first conductive polymer layer covering at least a part of the dielectric layer and including a first conductive polymer; and a second conductive polymer layer covering at least a part of the first conductive polymer layer and including a second conductive polymer, the second conductive polymer layer is a layer in which the second conductive polymer, a polymer dopant, and a hydroxy compound are mixed, the hydroxy compound is at least one selected from the group consisting of hexanediol, neopentyl glycol, trimethylolpropane, and catechol, the first conductive polymer layer further includes the hydroxy compound, and a concentration of the hydroxy compound included in the second conductive polymer layer is higher than a concentration of the hydroxy compound included in the first conductive polymer layer.

3. An electrolytic capacitor, comprising:

an anode body including a dielectric layer; and a solid electrolyte layer covering at least a part of the dielectric layer, wherein:

the solid electrolyte layer includes:

a first conductive polymer layer covering at least a part of the dielectric layer and including a first conductive polymer; and a second conductive polymer layer covering at least a part of the first conductive polymer layer and including a second conductive polymer, the second conductive polymer layer is a layer in which the second conductive polymer, a polymer dopant, and a hydroxy compound are mixed, the hydroxy compound is at least one selected from the group consisting of hexanediol, neopentyl glycol, trimethylolpropane, and catechol, and the first conductive polymer layer does not include the hydroxy compound.

4. A method for manufacturing an electrolytic capacitor, comprising:

preparing an anode body including a dielectric layer; and forming a solid electrolyte layer covering at least a part of the dielectric layer and including a hydroxy compound, wherein:

forming the solid electrolyte layer includes:

forming, with use of a first treatment solution, a first conductive polymer layer covering at least apart of the dielectric layer and including a first conductive polymer; and forming, with use of a second treatment solution, a second conductive polymer layer covering at least a part of the first conductive polymer layer and including a second conductive polymer, the second treatment solution contains a polymer dopant and the hydroxy compound, and the hydroxy compound is at least one selected from the group consisting of hexanediol, neopentyl glycol, trimethylolpropane, and catechol, the first treatment solution and the second treatment solution each contain the hydroxy compound, and a concentration of the hydroxy compound contained in the second treatment solution is higher than a concentration of the hydroxy compound contained in the first treatment solution.

5. A method for manufacturing an electrolytic capacitor, comprising:

preparing an anode body including a dielectric layer; and forming a solid electrolyte layer covering at least a part of the dielectric layer and including a hydroxy compound, wherein:

forming the solid electrolyte layer includes:

forming, with use of a first treatment solution, a first conductive polymer layer covering at least a part of the dielectric layer and including a first conductive polymer; and forming, with use of a second treatment solution, a second conductive polymer layer covering at least a part of the first conductive polymer layer and including a second conductive polymer, the second treatment solution contains a polymer dopant and the hydroxy compound, and the hydroxy compound is at least one selected from the group consisting of hexanediol, neopentyl glycol, trimethylolpropane, and catechol, and the first treatment solution does not include the hydroxy compound.

6. A method for manufacturing an electrolytic capacitor comprising:

preparing an anode body including a dielectric layer; and forming a solid electrolyte layer covering at least a part of the dielectric layer and including a hydroxy compound, wherein:

forming the solid electrolyte layer includes:

forming, with use of a first treatment solution, a first conductive polymer layer covering at least a part of the dielectric layer; and forming, with use of a second treatment solution, a second conductive polymer layer covering at least a part of the first conductive polymer layer, the first treatment solution contains a first conductive polymer and the hydroxy compound, and the second treatment solution contains a second conductive polymer, a polymer dopant, and the hydroxy compound, the hydroxy compound has two or more alcoholic hydroxy groups or two or more phenolic hydroxy groups, the hydroxy compound having a melting point ranging from 40° C. to 150° C., inclusive, and a concentration of the hydroxy compound contained in the second treatment solution is higher than a concentration of the hydroxy compound contained in the first treatment solution.

* * * * *